United States Patent
Dropps

(10) Patent No.: US 10,268,630 B1
(45) Date of Patent: Apr. 23, 2019

(54) NONCOHERENT INTERPROCESSOR COMMUNICATION REMAPPING NODE CONTROLLER

(71) Applicant: Hewlett Packard Enterprise Development LP, Houston, TX (US)

(72) Inventor: Frank R. Dropps, Eagan, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/792,644

(22) Filed: Oct. 24, 2017

(51) Int. Cl.
G06F 12/00 (2006.01)
G06F 15/173 (2006.01)
G06F 12/0817 (2016.01)
G06F 9/54 (2006.01)

(52) U.S. Cl.
CPC .... *G06F 15/17331* (2013.01); *G06F 12/0828* (2013.01); *G06F 9/544* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 8,069,336 B2* | 11/2011 | Alsup | G06F 9/3802 712/207 |
| 8,713,295 B2 | 4/2014 | Bax et al. | |
| 8,738,860 B1 | 5/2014 | Griffin et al. | |
| 9,448,940 B2* | 9/2016 | Shalf | G06F 12/0813 |
| 2005/0080978 A1* | 4/2005 | Kelley | G06F 13/4027 710/317 |
| 2007/0255894 A1* | 11/2007 | Hessel | G06F 9/30036 711/105 |
| 2017/0068639 A1* | 3/2017 | Davis | H04L 45/60 |
| 2017/0091090 A1* | 3/2017 | Wang | G06F 12/0808 |
| 2017/0149921 A1 | 5/2017 | Nassi et al. | |

OTHER PUBLICATIONS

Welsh, M. et al., "Incorporating Memory Management Into User-level Network Interfaces," (Web Page), 1997, 10 pages, http://citeseerx.ist.psu.edu/viewdoc/download?doi=10.1.1.582.6743&rep=rep1&type=pdf.

* cited by examiner

Primary Examiner — Daniel D Tsui
(74) Attorney, Agent, or Firm — Rathe Lindenbaum LLP

(57) ABSTRACT

A first node controller may include logic to direct the first node controller to: receive a noncoherent inter-processor communication from a source processor, remap the noncoherent inter-processor communication to a local address space of a destination processor and transmit the noncoherent inter-processor communication directly to a second node controller of the destination processor using an interconnect interface that also carries coherent communications.

15 Claims, 2 Drawing Sheets

NONCOHERENT INTERPROCESSOR COMMUNICATION REMAPPING NODE CONTROLLER

BACKGROUND

A multi-processor system can include multiple processors that can be associated with respective local memories. The multi-processor system can be arranged as a cache-coherent non-uniform memory access (ccNUMA) system in which a processor can remotely access a memory associated with another processor.

Figure 1:
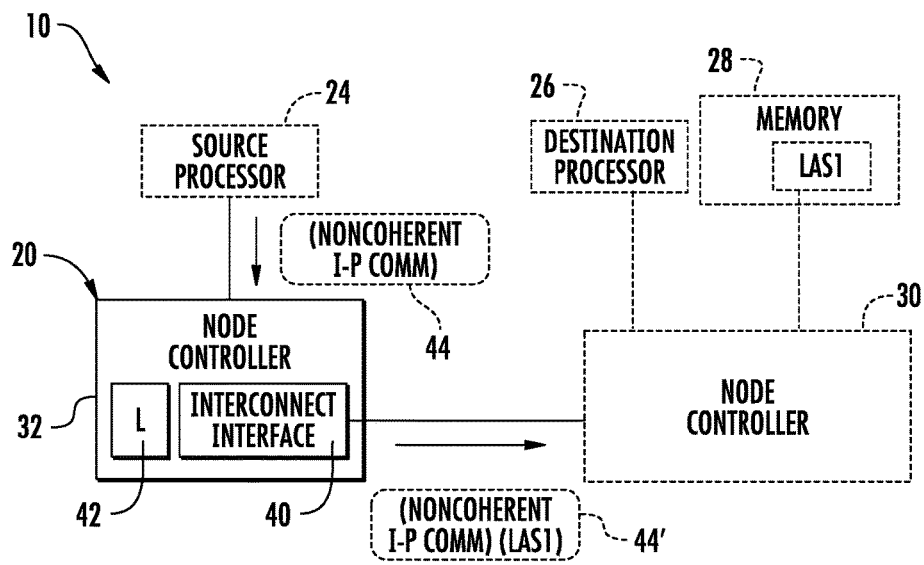
FIG. 1 is a schematic diagram illustrating portions of an example node controller as part of an example multiprocessor system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

A node controller is electronic device, such as an integrated circuit, that controls communications and messaging in a socket group and between different socket groups or processors of a multiprocessor system. Each of the disclosed node controllers comprises an interconnect interface that carries or transmits coherent communications and noncoherent communications. A socket group is a grouping of at least one processor having at least one processor socket and at least one node controller, wherein each of the processor sockets are directly interconnected to one another and wherein the at least one processor has at least one local memory.

Disclosed herein are example node controllers, systems and methods that reduce the amount of latency in messaging operations between different socket groups. The disclosed example node controller, systems and methods reduce such latency by keeping noncoherent interprocessor communications out of cache coherency protocol sequences while providing security protections and validation. The disclosed example node controllers, systems and methods intercept processor generated noncoherent interprocessor communications and remap such communications to local address spaces of the destination processor or socket group. In the example implementations, the noncoherent interprocessor communications are directly transmitted to the node controller of the destination processor or socket group.

Disclosed herein is an example node controller node that may comprise logic to direct the first node controller to: receive a noncoherent inter-processor communication from a source processor, remap the noncoherent inter-processor communication to a local address space of a destination processor and transmit the noncoherent inter-processor communication directly to a second node controller of the destination processor using an interconnect interface that also carries coherent communications.

Disclosed herein is an example multiprocessor system that may comprise a first processor socket group and a second processor socket group. The first processor socket group may comprise a first processor socket and a first node controller. The second processor socket group may comprise a second processor socket and a second node controller. The second node controller may comprise logic to cause a second node controller to: receive a noncoherent inter-processor communication from the second processor socket, remap the noncoherent inter-processor communication to a local address space of the first processor socket and transmit the noncoherent inter-processor communication directly to the first node controller using an interconnect interface that also carries coherent communications.

Disclosed herein is an example method that may comprise receiving, with a first node controller, a noncoherent inter-processor communication from a source processor, remapping, with the first node controller, the communication to a local address space of a destination processor and transmitting the communication directly from the first node controller to a second node controller of the destination processor using an interconnect interface that also carries coherent communications. The method may further comprise remapping the communication to a user application's address space with the second node controller, performing protection checking with the second controller and notifying the destination processor of the communication's arrival with the second node controller.

FIG. 1 schematically illustrates portions of an example node controller 20 for use in an example cache-coherent non-uniform memory access (ccNUMA) system 10 (shown in broken lines). In addition to node controller 20, system 10 comprises a "source" processor 24, a "destination" processor 26, memory 28 and node controller 30. Source processor 24 and destination processor 26 comprise different processors having processor sockets and associated with different socket groups. Destination processor 26 has an associated memory 28. Node controller 30 controls messaging and communication for least destination processor 26 in the socket group containing processor 26. Node controller 30 is directly connected to destination processor 26 and is directly connected to memory 28. In one implementation, node controller 30 may be similar to node controller 20. In another example, the memory 28 is attached directly to the destination processor 26 and not the node controller 30.

Node controller 20 reduces the amount of latency in messaging operations between different socket groups. Node controller 20 reduces such latency by keeping noncoherent interprocessor communications out of cache coherency protocol sequences while providing security protections and validation. Node controller 20 intercepts processor generated noncoherent interprocessor communications and remap such communications to local address spaces of the destination processor or socket group. In the example implementations, the noncoherent interprocessor communications are directly transmitted to the node controller of the destination processor or socket group. Node controller 20 comprises electronics component or an integrated circuit 32 which comprises interconnect interface 40 and logic 42.

Interconnect interface 40 comprising interface that is directly connected to node controller 30. Interconnect interface 40 carries coherent communications.

Logic 42 comprises logic elements or component is part of circuit 32. Logic 42 causes node controller 20 to receive a noncoherent interprocessor communication 44 from source processor 24. Logic 42 further causes node controller 22 remap the noncoherent interprocessor communication 44 to a local address space (LAS1) of memory 28 of destination processor 26 as indicated by communication 44'. Logic 42 causes node controller 22 to transmit the noncoherent interprocessor communication 44' directly to node controller 30 using interface interconnect 40. Because logic 42 automatically remaps the non-coherent interprocessor communication 44 to the local address space LAS1 of memory 28 of the destination processor 26 and transmits the noncoherent interprocessor communication 44' directly to node controller 30 associated with the destination processor 26, the noncoherent interprocessor communication avoids or is removed from the cache coherency domain of source processor 26. As a result, latency is reduced.

Figure 2:
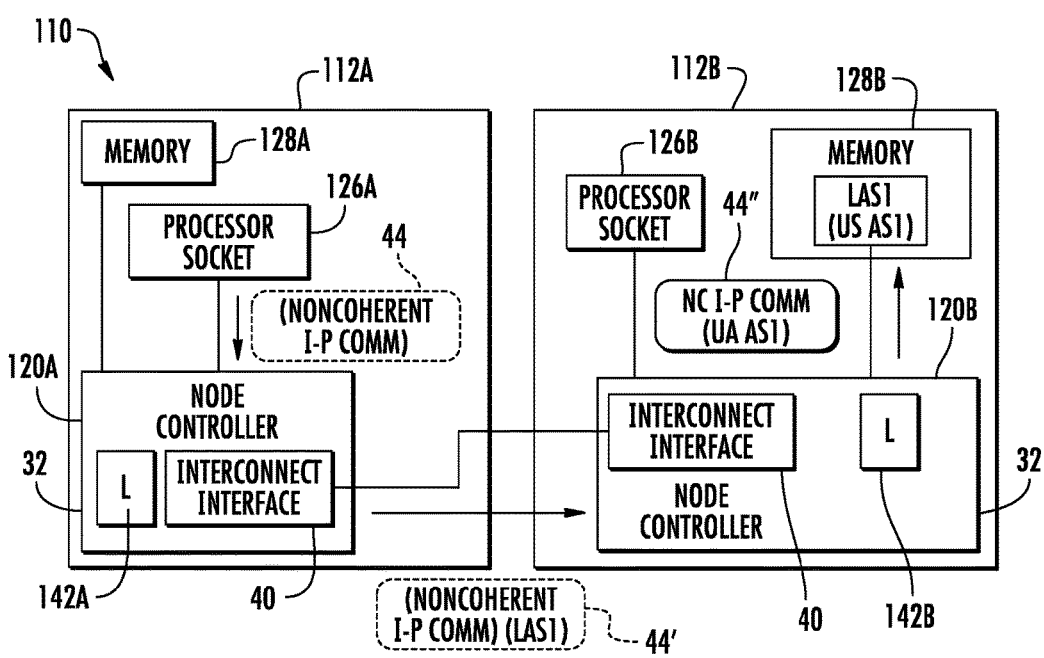
FIG. 2 is a schematic diagram of an example multiprocessor system.

FIG. 2 is a schematic diagram illustrating portions of an example cache-coherent non-uniform memory access (ccNUMA) system 110. System 110 comprises socket groups 112A, 112B (collectively referred to as socket groups 112) connected to one another as part of a network.

Socket groups 112A, 112B comprise at least one processor having at least one processor socket 126A, 126B, at least one memory 128A, 128B associated with the socket group and at least one node controller 120A, 120B, respectively. Node controllers 120A and 120B are each similar to node controller 20 described above. Node controllers 120A, 120B (collectively referred to as node controllers 120) comprise interconnect interfaces 40 (described above) and logics 142A, 142B, respectively.

Logics 142 of node controllers 120 comprises logic elements or components part of circuit 32. Logic 142A of node controller 120A receives a noncoherent interprocessor communication 44 from processor socket 126A. Logic 142A causes node controller 120A to remap the noncoherent interprocessor communication 44 to a local address space (LAS1) of memory 128B of destination processor socket 126B as indicated by communication 44'. Logic 142A causes node controller 120A to transmit the noncoherent interprocessor communication 44' directly to node controller 120B using interface interconnect 40. Because logic 142A automatically remaps the non-coherent interprocessor communication 44 to the local address space LAS1 of memory 128B of the destination processor socket 126B and transmits the noncoherent interprocessor communication 44' directly to node controller 120B of socket group 112B, the noncoherent interprocessor communication 44 avoids or is removed from the cache coherency protocol sequences of socket group 112A. As a result, latency is reduced.

As further shown by FIG. 2, logic 142B of node controller 120B causes node controller 120B to remap the received noncoherent interprocessor communication 44' to a user application address space (UAAS1) in memory 128B (schematically shown as communication block 44"). In one implementation, the user application address space comprises a virtual address space in memory 128B. In one implementation, the noncoherent interprocessor communication 44 is from a first application operating in socket group 112A under a first operating system, wherein the communications transmitted to a second application operating in socket group 112B under a second operating system, different than the first operating system. In another example, the memory 128A and 128B are attached directly to processor sockets 126A and 126B respectively.

In one implementation, logic 142B further causes node controller 120B to determine whether to apply a coherency protocol to the communication 44'. Depending upon the particular coherency protocol adhered to by node controller 120B, node controller 120B may transmit communication 44" to processor socket 126B for application or carrying out of the coherency protocol. In some circumstances, depending upon the particular coherency protocol adhered to by node controller 120B, logic 142B may directly transmit the communication 44" to memory 128B. In implementations where communication 44" is directly transmitted to memory 128B, avoiding application of the coherency protocol and avoiding transmission to processor socket 126B, latency may be further reduced.

In some implementations, logic 142B may carry out additional processes on communication 44' prior to forwarding communication 44', either to processor socket 126B or directly to memory 128B. in one implementation, logic 142B may cause node controller 120B to additionally perform validation or protection checking with respect to the communication 44'. For example, logic 142B may confirm the authorization of processor socket 126A or its processor to transmit the communication. In some implementations, logic 142B may notify the processor associated with processor socket 126B of the arrival of communication 44".

Logic 142A and logic 142B are similar to one another in that logic 142B may function in a fashion similar to that described above with respect to logic 142A. Likewise, logic 142A may function in a fashion similar to that described above with respect to logic 142B. Logic 142B may receive a noncoherent interprocessor communication from processor socket 126B, may remap the communication to a local address space of memory 128A and may transmit the communication directly to node controller 120A via interconnect interface 40. Likewise, logic 142A may receive the communication and may remap the communication (sometimes referred to as translating the communication) to the user application address space in memory 128A. As discussed above, depending upon the coherency protocol adhered to by node controller 120A, the communication may be transmitted to processor socket 126A for application of the coherency protocol or the communication may be directly transmitted to the user application address space of memory 128A.

Similar to logic 142B, logic 142A may also carry out validation or protection checking as well. Logic 142A may notify processor socket 126A of the arrival of the communication from node controller 120B. The noncoherent interprocessor communications transmitted between socket groups 112 may be in the form of requests and/or may be in the form of responses or any other type of information containing message or packet.

Figure 3:
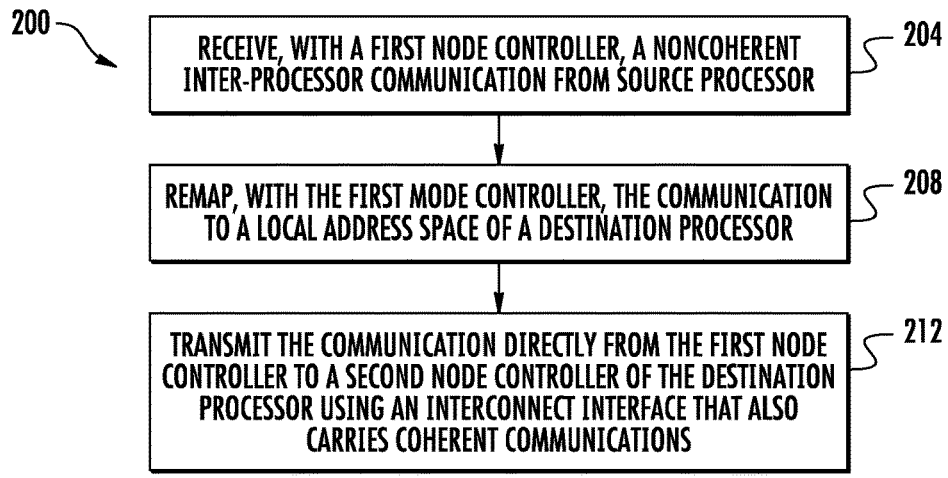
FIG. 3 is a flow diagram of an example method for reducing latency when transmitting noncoherent interprocessor communications.

FIG. 3 is a flow diagram of an example method 200 for reducing latency when transmitting noncoherent interprocessor communications. Method 200 reduces such latency by keeping noncoherent interprocessor communications out of cache coherency protocol sequences while providing security protections and validation. Although method 200 is described as being carried out with respect to system 110, it should be appreciated that method 200 may likewise be carried out with system 10 or with any other similar cache-coherent non-uniform memory access (ccNUMA) systems or multiprocessor systems.

As indicated by block 204, node controller 120A receives a noncoherent interprocessor communication 44 from a source processor, such as a source processor having processor socket 126A. As indicated by block 208, node controller 120A remaps the communication 44 to the local address space LAS1 of the destination processor, the local address space of memory 128B associate with the destination processor having processor socket 126B. In some implementations, the remapping could also be performed by node controller 120B. As indicated by block 212, the remapped communication is transmitted directly from node controller 120A to node controller 120B of the destination processor having's processor socket 126B using the interconnect interface 40 of node controller 120A, wherein the interconnect interface 40 of node controller 120 also carries coherent communications. Because node controller 120A remaps the non-coherent interprocessor communication 44 to the local address space LAS1 of memory 28 of the destination processor 26 and transmits the noncoherent interprocessor communication 44' directly to node controller 30 associated with processor socket 126B, the noncoherent interprocessor communication 44 avoids or is removed from the cache coherency protocol sequences of socket group 112A. As a result, latency is reduced.

Figure 4:
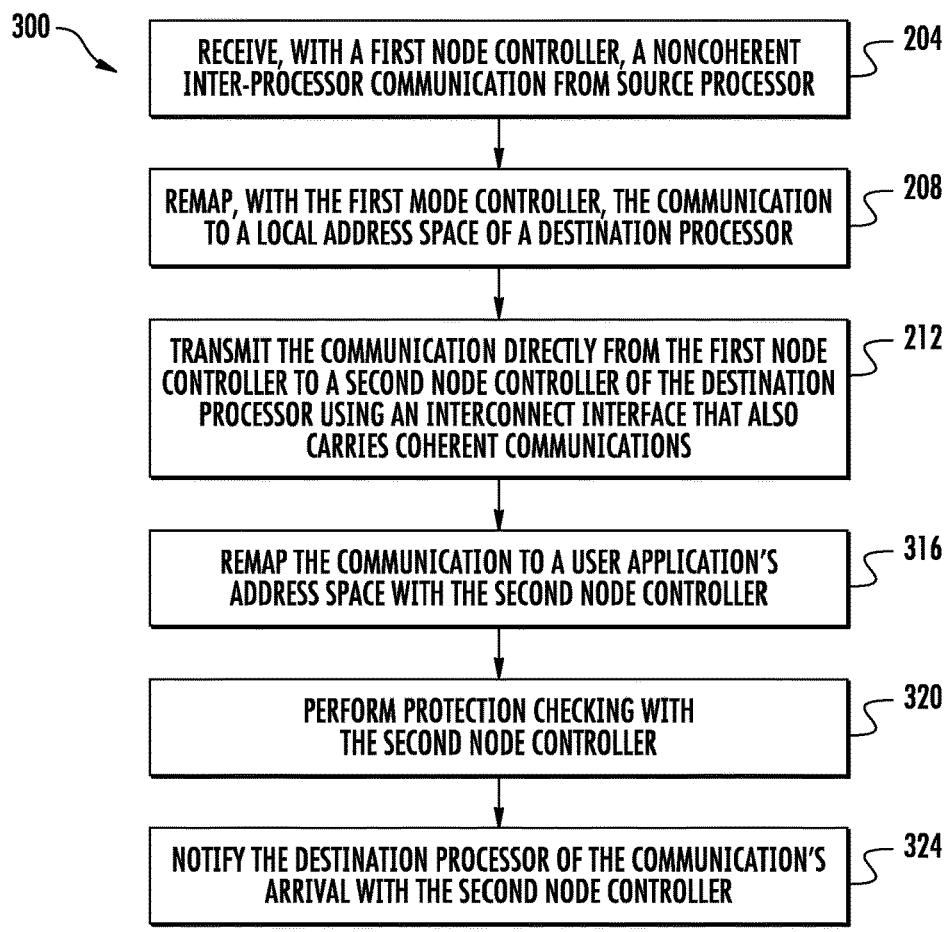
FIG. 4 is a flow diagram of an example method for reducing latency when transmitting noncoherent interprocessor communications.

FIG. 4 is a flow diagram of an example method 300 for reducing latency when transmitting noncoherent interprocessor communications. Method 300 is similar to method 200 described above except that method 300 involves additional functions carried out by the second node controller. Those blocks of method 300 which correspond to blocks of method 200 are numbered similarly.

As indicated by block 316, upon receiving a noncoherent interprocessor communication 44', node controller 120B remaps (or translates) the communication 44' to a user application (USAS1) in the memory 128B associated with processor socket 126B. In one implementation, the user application address space comprises a virtual address space in memory 128B. In one implementation, the noncoherent interprocessor communication 44 is from a first application operating in socket group 112A under a first operating system, wherein the communications transmitted to a second application operating in socket group 112B under a second operating system, different than the first operating system.

In one implementation, node controller 120B may determine whether to apply a coherency protocol to the communication 44'. Depending upon the particular coherency protocol adhered to by node controller 120B, node controller 120B may transmit communication 44" to processor socket 126B for application or caring out of the coherency protocol. In some circumstances, depending upon the particular coherency protocol adhered to by node controller 120B, node controller 120B may directly transmit the communication 44" to memory 128B. In implementations where communication 44" is directly transmitted to memory 128B, avoiding application of the coherency protocol in avoiding transmission to processor socket 126B, latency may be further reduced.

As indicated by block 20, node controller 120B may additionally perform validation or protection checking with respect to the communication 44'. For example, node controller 120B may confirm the authorization of processor socket 126A, its processor core or user application to transmit the communication. As indicated by block 324, where communication 44" is written directly to memory 128B, node controller 120B may notify the processor associate with processor socket 126B of the arrival of communication 44".

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noded, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A first node controller comprising:
   logic to direct the first node controller to:
   receive a noncoherent inter-processor communication from a source processor;
   remap the noncoherent inter-processor communication to a local address space of a destination processor; and
   transmit the noncoherent inter-processor communication directly to a second node controller of the destination processor using an interconnect interface that also carries coherent communications.

2. The first node controller of claim 1, wherein the noncoherent interprocessor communication is from a first application operating in a first operating system and is to be transmitted to a second application operating in a second operating system different than the first operating system.

3. The first node controller of claim 1 further comprising data storage storing an address for the local address space of the destination processor.

4. A method comprising:
   receiving, with a first node controller, a noncoherent inter-processor communication from source processor;
   remapping, with the first node controller, the communication to a local address space of a destination processor; and
   transmitting the communication directly from the first node controller to a second node controller of the destination processor using an interconnect interface that also carries coherent communications;
   remapping the communication to a user application's address space with the second node controller;
   performing protection checking with the second node controller; and
   notifying the destination processor of the communication's arrival with the second node controller.

5. The method of claim 4, wherein the noncoherent interprocessor communication is from a first application operating in a first operating system and is to be transmitted to a second application operating in a second operating system different than the first operating system.

6. The method of claim 4 further comprising transmitting the communication directly from the first node controller to the second node controller of the destination processor a coherency protocol having been applied by the first node controller to the communication.

7. The method of claim 4 further comprising:
remapping the communications to an application's address space with the second node controller;
performing protection checking with the second node controller; and
notifying the destination processor of the messages arrival with the second node controller.

8. The method of claim 4 further comprising:
receiving, with the first node controller, a second noncoherent interprocessor communication from the second node controller;
translating the second noncoherent interprocessor communication, with the first node controller, to a format for use by an application on a processor in a processor socket group containing the node controller.

9. The method of claim 4 further comprising:
determining, with the first node controller, whether to apply a coherency protocol to the second noncoherent interprocessor communication; and
applying, with the first node controller, the coherency protocol to the second noncoherent interprocessor communication based upon the determination.

10. A system comprising:
a first processor socket group comprising:
a first processor socket; and
a first node controller; and
a second processor socket group comprising:
a second processor socket; and
a second node controller, the second node controller comprising logic to cause a second node controller to:
receive a noncoherent inter-processor communication from the second processor socket;
remap the noncoherent inter-processor communication to a local address space of the first processor socket; and
transmit the noncoherent inter-processor communication directly to the first node controller using an interconnect interface that also carries coherent communications.

11. The system of claim 10, wherein the noncoherent interprocessor communication is from a first application operating in a first operating system and is to be transmitted to a second application operating in a second operating system different than the first operating system.

12. The system of claim 10, wherein the first node controller comprises logic causing the first node controller to:
remap the noncoherent inter-processor communication to a user application's address space;
perform protection checking with respect to the noncoherent inter-processor communication; and
notify the destination processor of arrival of the noncoherent inter-processor communication.

13. The system of claim 10, wherein the logic is to further cause the first node controller to:
determine whether to apply a coherency protocol to the noncoherent interprocessor communication; and
apply the coherency protocol to the noncoherent interprocessor communication based upon the determination.

14. The system of claim 10, wherein the transmission of the noncoherent interprocessor communication is directly from the second node controller to the first node controller without a coherency protocol having been applied by the second node controller to the noncoherent interprocessor communication.

15. The system of claim 10, wherein the second node controller is to:
remap a response communication to a local address space of the first processor socket; and
transmit the response communication directly to the first node controller using an interconnect interface that also carries coherent communications.

\* \* \* \* \*